Figure 5:
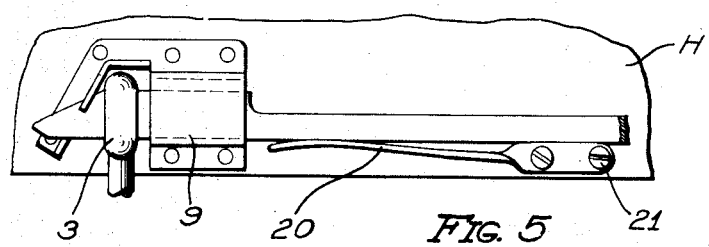

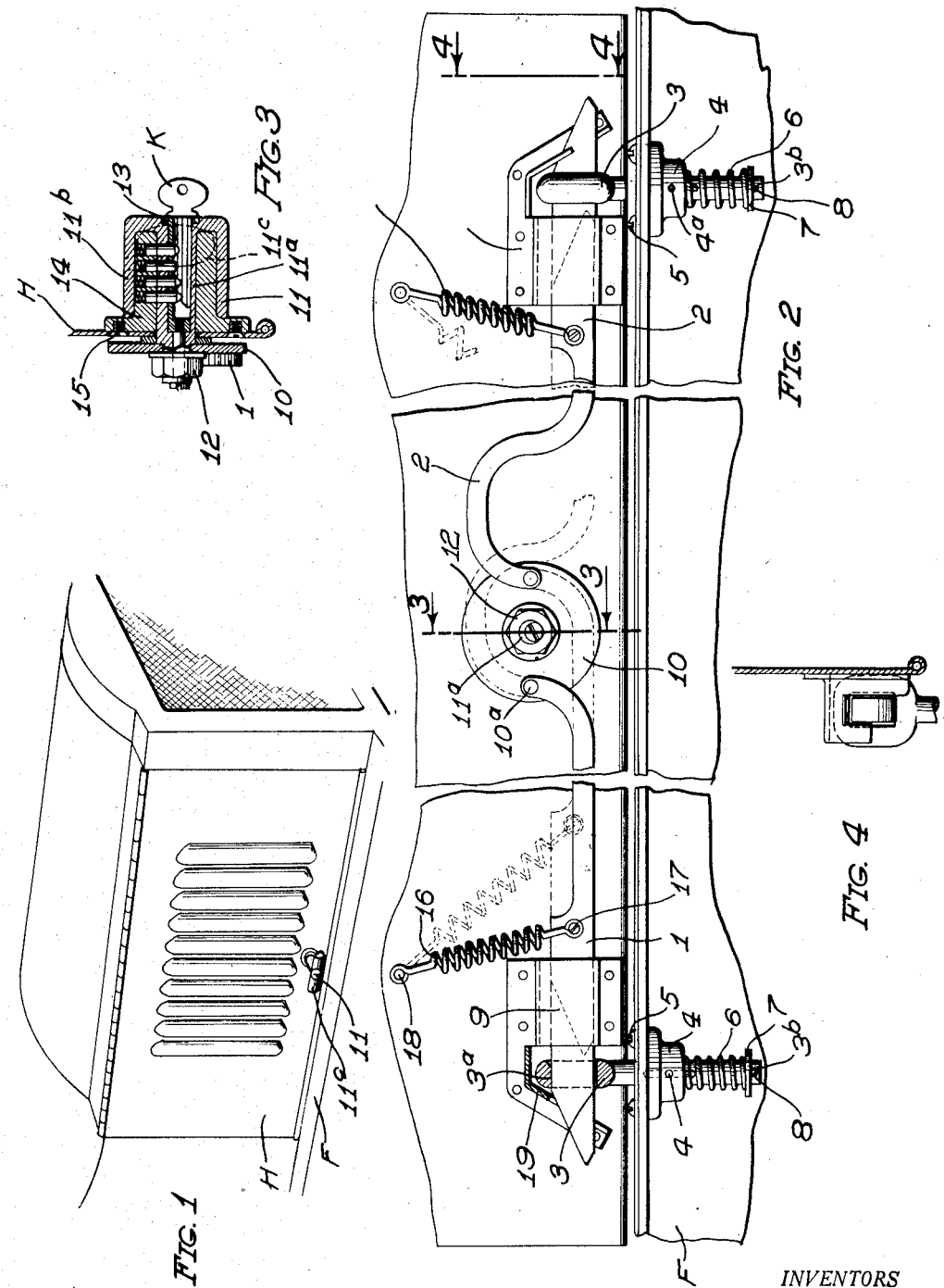

Nov. 20, 1928.  A. C. McBRIDE ET AL  1,692,558
AUTOMOBILE ENGINE HOOD RETAINING AND LOCKING MEANS
Filed Oct. 26, 1926   2 Sheets-Sheet 2

INVENTORS
ARTHUR C. McBRIDE
FREDERICK W. RENWORTH
BY
A.B. Bowman
ATTORNEY

Patented Nov. 20, 1928.

1,692,558

UNITED STATES PATENT OFFICE.

ARTHUR C. McBRIDE AND FREDERICK W. RENWORTH, OF SAN DIEGO, CALIFORNIA, ASSIGNORS OF ONE-THIRD TO CHARLES H. E. REMONDINO, OF SAN DIEGO, CALIFORNIA.

AUTOMOBILE ENGINE-HOOD RETAINING AND LOCKING MEANS.

Application filed October 26, 1926. Serial No. 144,239.

Our invention relates to automobile engine hood retaining and locking means.

The objects of our present invention are; first, to provide means of this class whereby both ends of the hood at one side may be simultaneously secured to the body of the automobile; second, to provide a means of this class whereby the hood may be effectively and easily locked in position; third, to provide means of control and locking mechanism for means of this class similar to control means and locking mechanism elsewhere employed on the automobile, such as on the doors of enclosed automobiles, whereby the same closing movement and key may be employed throughout; fourth, to provide means of this class whereby the hood may be secured tightly at its lower edge or portion to the frame of the automobile with very little effort, without pulling or otherwise distorting springs on hood retaining plungers or other securing means, without getting into uncomfortable and inconvenient positions to secure the hood in position or release the same, or without soiling one's clothes by reason of the ready accessibility of the securing means and the operation thereof by one hand; fifth, to provide means of this class whereby the hood may be shifted into place and secured in position by a single means operable by one hand only, and also whereby the hood may be released and raised out of place with said single means and by the operation of one hand; sixth, to provide a means of this class whereby single spring means is employed for retaining the same in a locked position and resiliently holding the hood downwardly; seventh, to provide a means of this class having guiding devices whereby the hood is guided over or into operative relation with the keeper or retaining means on the frame of the automobile so that the hood will readily slip into place with a minimum of effort; eighth, to provide a novel handle and locking mechanism for means of this class; ninth, to provide means of this class in which all parts are normally concealed from view and access except the handle for raising and lowering the hood and for operating the latching and locking mechanism; tenth, to provide as a whole a novelly constructed and arranged automobile hood retaining and locking means, and eleventh, to provide a means of this class which is simple and economical of construction proportionate to its functions, durable, efficient, and which will not readily deteriorate or get out of order.

Figure 6:
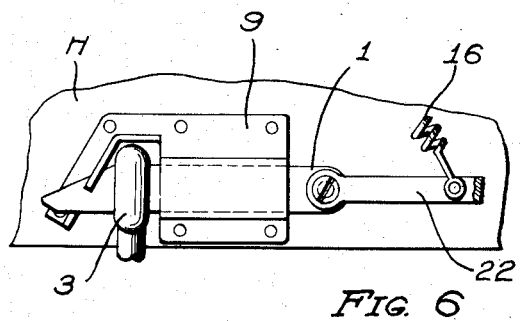
Figure 7:
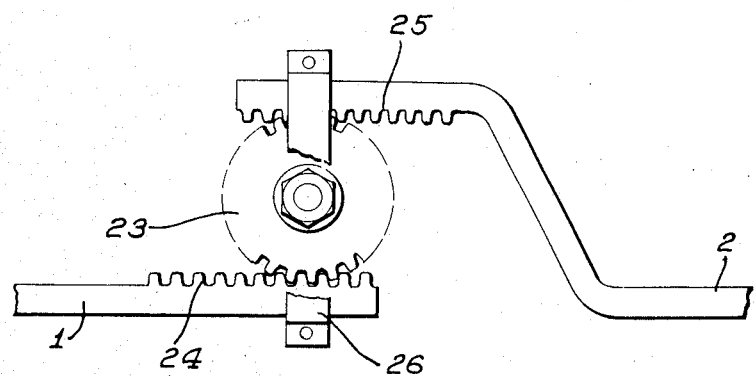

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a front, top and side perspective view of the right side of an automobile hood, showing its relation to the adjacent parts of an automobile and showing our securing and locking means in connection therewith; Fig. 2 is an enlarged fragmentary elevational view of the lower portion of the inside of the hood and the associated portion of the frame of the automobile, showing our securing and locking means in connection therewith, certain parts and portions of the means being shown broken away and in section to facilitate the illustration, and others being shown by dotted lines shifted to certain receded positions; Fig. 3 is a longitudinal sectional view through the locking mechanism, taken on the line 3—3 of Fig. 2, certain parts and portions thereof being shown in elevation to facilitate the illustration; Fig. 4 is a fragmentary sectional elevational view of our means, taken at 4—4 of Fig. 2; Fig. 5 is a fragmentary elevational view, taken from the inside of the automobile hood, showing a certain modified form of construction of our means in which a different type of spring is employed; Fig. 6 is another fragmentary elevational view thereof, showing the bolt connected with the shifting mechanism by a pivotal connection, and Fig. 7 is another slightly modified form of construction, showing rack and gear means for shifting the latch members or bolts.

Like characters of reference refer to similar parts and portions throughout the several views of the drawings.

The bolts 1 and 2, keepers 3, keeper guides 4, screws 5, springs 6, washers 7, pins 8, guide plates 9, bolt shifting disc 10, lock barrel 11, nut 12, key barrel 13, lock cylinder casing 14, screws 15, tension springs 16, pins 17 and 18, and the hood guide members 19 constitute the principal parts and portions of our hood securing and locking means in one form of construction.

In the present method of automobile construction, the engine hood of the automobile is secured in position over the body and to the frame by securing means at the opposite sides of the automobile and near the opposite ends of the hood. With our means the hood is secured to the automobile frame preferably at the same portions or places, but our securing means is at the inside of the hood instead of at the outside.

Our securing means consists of bolts and keepers, the former, 1 and 2, being reciprocally mounted at the inner sides of the hood and near and substantially parallel with the lower edge of the hood, and the latter, 3, being reciprocally mounted in and on the frame and projecting upwardly above the frame within the hood. The keeper 3, one being provided near either end of the hood and at both sides of the automobile, consists of an eye 3ª at its upper end and a shank 3ᵇ at its lower end. At the lower side of the upper portion of the frame F of the automobile is secured, by means of screws 5, a keeper guide 4. The shank 3ᵇ extends through the upper portion of the frame as well as through the guide 4. Around the shank 3ᵇ is a compression spring 6, the ends of which are positioned between the guide 4 and a washer 7 retained in position at the lower end of the shank 3ᵇ by a pin 8. The keeper 3 may be prevented from rotating relative to the frame by means of a square shank or by means of a pin 4ª extending through a longitudinal slot in the shank of the keeper.

The outer ends of the bolts are supported and guided by guide plates 9 secured to the inner sides of the hood in any suitable manner. The opposite ends, or inner ends, of the bolts are pivotally connected, by means of pins or bolts 10ª, to the one side and near the peripheral portions of the bolt shifting disc 10, said bolt being connected thereto at opposite sides of its axis.

The disc 10 is non-rotatably secured to the inner end of the barrel 11 which is rotatably mounted and extends through the hood H near its lower edge and intermediate its ends. The barrel 11 forms the revolving and controlling member of the lock which may be of any conventional construction or of any construction to suit the particular needs. As shown in the drawings, the barrel 11 is rotatably mounted within the cylinder casing 14 which is secured to the outer side of the hood H by means of screws 15 from the inner side of the hood. The barrel 11 extends outwardly beyond the end of the cylinder casing 14 and around the peripheral surface thereof. To the portion of the barrel extending around the casing 14, indicated by 11ᵇ, are secured opposed handle or grip portions 11ᶜ, as shown in Fig. 1 and indicated by dotted lines in Fig. 3, for readily rotating the barrel when the same is released. Within the casing 14 and the barrel 11 are reciprocally mounted the cylinders or plugs which control the rotation of the one relative to the other. As shown, the cylinders or plugs extend into another barrel 13, which is the key receiving barrel for receiving the key K. The cylinders or plugs extend into the barrel 13 and are controlled by the key for releasing the barrel 11.

The outer ends of the bolts 1 and 2 are permitted slight vertical movement by the guide plates 9 and are forced against the upper guide portions of said plates by means of tension springs 16 secured at their lower and upper ends by means of pins or members 17 and 18 respectively to the bolts and the inner side of the hood, as shown. Said springs act in opposed relation to the springs 6 of the keepers. Therefore, both will yield slightly when the outer ends of the bolts are inserted through the eyes of the keepers. The springs 16 are also so connected relative to the bolts and the hood that the same tend to force the bolts outwardly and retain the same in engagement with the keepers. Said springs are also so arranged that when the bolts are shifted inwardly, as indicated by dotted lines in Fig. 2, the same will resiliently hold the bolts in their withdrawn positions by reason of the relation of the respective centers of the fixed end of the spring, the axis of rotation of the disc and the pivotal connections of the bolts with said discs.

It will be noted that the inner end of one of the bolts is offset or provided with a gooseneck whereby the inner ends of the bolts are avoided by each other.

It will be here also noted that the outer ends of the bolts are beveled at their upper sides so that when only the extreme outer ends are brought into engagement with the eyes of the keepers, said bolts, when shifted outwardly by the handle means, withdraw the keepers against the action of their respective springs and also draw the outer portions of the bolts against the lower guide portions of the guide plates 9 against the actions of the springs 16, thus positively as well as, to a certain extent, resiliently holding the hood in a downward position relative to the body of the automobile.

At the outer sides of the keepers 9 and in spaced relation therewith are provided angularly positioned hood guide members 19 which may be made integral parts of the plates 9, as shown. Said hood guide members are inclined at angles with the vertical and diverge downwardly relative to each other and to the guide plates 9. Thus when the hood is lowered to position and is slightly out of line, the guide members 19 engage the relatively outer sides of the keepers 3 and guide the same to position.

As shown in Figs. 2 and 4, the guide members 19 are slotted so as to provide clearance for the outer ends of the bolts.

In the modified form of construction, shown in Fig. 5, the construction is identical except that the coil springs of the former construction are replaced by a plate spring 20 secured to the hood H by screws 21, or other means. Said spring extends toward the outer end of the bolt and engages the under side thereof.

In the modified form of construction, shown in Fig. 6, the bolt 1 is relatively short and is connected at its inner end, by means of a connecting link 22, with the bolt shifting disc, not shown. Thus, it will be seen that the bolt 1 must have a relatively long guide and cannot be permitted free vertical play within the guide plate 9, as in the above described constructions. In this modified form of construction the spring 16 is preferably connected with the connecting link and tends to force the bolts outwardly as well as to lock the same in inwardly shifted positions, as described above.

In the modified form of construction, shown in Fig. 7, the bolt shifting disc or member consists of a gear 23 which engages with the teeth of gear racks 24 and 25 at its diametrically opposite sides. Said gear racks are provided at the inner ends of bolt members 1 and 2 of similar construction as those described above. The inner ends of the racks 24 and 25 are retained relative to each other and relative to the gear 23, by means of a guide strap 26 extending around or over the same and secured to the inner side of the hood, as shown, the strap 26 being shown broken away to facilitate the illustration. Thus, when the gear 23 is rotated in one direction both bolts are either shifted outwardly or inwardly, as in the other mechanisms described above.

Though we have shown and described a particular construction, combination and arrangement of parts and portions and certain modifications thereof, we do not wish to be limited to this particular construction, combination and arrangement nor to the modifications, but desire to include in the scope of our invention the construction, combination and arrangement substantially as set forth in the appended claims.

Having thus described our invention, what we claim as new and desire to secure by Letters Patent is:

1. In a means of the class described, a guide member, a bolt member longitudinally reciprocally mounted in said guide member and also laterally shiftable therein, a rotatable member pivotally connected to the inner end of said bolt member, and a spring means adapted to force said bolt member outwardly and normally against one side of said guide member and adapted also to resiliently retain said bolt member in its withdrawn position.

2. In a means of the class described, the combination with the hood and frame of an automobile, of keepers reciprocally mounted in vertical directions on said frame, bolt members reciprocally mounted on said hood at the inner side thereof adapted to engage with said keepers, means for actuating said bolt members, and guide means at the inner side of said hood adjacent the outer ends of said bolt members for guiding said hood over said keepers.

3. In a means of the class described, the combination with the hood and frame of an automobile, of keepers reciprocally mounted in vertical directions on said frame, bolt members reciprocally mounted on said hood at the inner side thereof adapted to engage with said keepers, means for actuating said bolt members, guide means at the inner side of said hood adjacent the outer ends of said bolt members for guiding said hood over said keepers, and other guide members at the inner side of said hood adapted for supporting the outer ends of said bolt members and positioned at the opposite sides of said keepers from said first mentioned guide members.

4. In a means of the class described, the combination with the hood and frame of an automobile, of latch means mounted at the inner side of said hood, keepers mounted on said frame adapted to be engaged by said latch members, means on said hood for actuating said latch members, said means extending to the outer side of said hood and provided with a latch operating and hood raising handle means, and a lock in connection with and forming a portion of said handle means.

In testimony whereof, we have hereunto set our hands at San Diego, California, this 16th day of October, 1926.

ARTHUR C. McBRIDE.
FREDERICK W. RENWORTH.